United States Patent
Scheib et al.

(10) Patent No.: US 6,683,263 B1
(45) Date of Patent: Jan. 27, 2004

(54) FALL AWAY TRANSMISSION SHIFT SHAFT SWITCH PROFILE

(75) Inventors: Patrick L. Scheib, Pinehurst, NC (US); Kenneth T. Picone, Pinehurst, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 10/323,524

(22) Filed: Dec. 18, 2002

(51) Int. Cl.$^7$ ................................................ H01H 9/06
(52) U.S. Cl. ................................ 200/61.88; 200/61.91
(58) Field of Search .............................. 74/335, 473.18, 74/475; 200/61.85, 61.88, 61.91; 340/456; 477/111

(56) References Cited

U.S. PATENT DOCUMENTS

| | | | | |
|---|---|---|---|---|
| 4,986,776 A | * | 1/1991 | Hensel et al. | 440/87 |
| 5,031,472 A | * | 7/1991 | Dutson et al. | 74/335 |
| 5,669,852 A | * | 9/1997 | Desautels et al. | 477/111 |
| 5,786,554 A | * | 7/1998 | Umezawa et al. | 200/61.88 |
| 6,324,928 B1 | * | 12/2001 | Hughes | 74/335 |
| 6,526,843 B1 | * | 3/2003 | Ross et al. | 74/473.28 |

* cited by examiner

Primary Examiner—Michael Friedhofer
(74) Attorney, Agent, or Firm—Carlson, Gaskey & Olds

(57) ABSTRACT

A transmission gear position sensing assembly includes a transmission housing with a bore having a shift shaft disposed therein. The shift shaft has an axis about which the shaft translates as the transmission is shifted between gear positions. The housing includes a hole with a switch assembly received in the hole transverse to the shift shaft axis. The shift shaft includes a profile aligned with the switch assembly. The profile has first, second, and third surfaces respectively spaced radially from the axis a first, second and third distance. The third surface is arranged between the first and second surfaces. The third distance is larger than the first and the second distances, and the third surface corresponds to a neutral gear position. The switch assembly includes a member biased to engagement with the profile by a spring. The switch assembly senses the gear precision by the corresponding location along the profile. Since the third surface, which corresponds to the neutral position, is raised from the other surfaces the shift effort is reduced as the vehicle operator shifts from the neutral position to one of the other gear positions. In this manner, the switch assembly and switch shaft configuration does not adversely effect the shift effort or shift feel.

8 Claims, 1 Drawing Sheet

FALL AWAY TRANSMISSION SHIFT SHAFT SWITCH PROFILE

BACKGROUND OF THE INVENTION

This invention relates to a heavy duty manual transmission, and more particularly, the invention relates to a shift shaft switch for the transmission which senses the location of the shift shaft.

Heavy duty tractor trailer transmissions have become more complex in recent years. As class 8 transmissions have evolved from pneumatic to electric controls, electronic sensors have become necessary to provide information to the transmission controller. Some of these sensors affect the driver while in the act of engaging or disengaging gears.

Heavy duty manual transmissions typically have shift shafts supported by a transmission housing. Shift forks are typically connected to the shift shafts and move the clutch collars into and out of engagement with the gears as the shift shafts are rotated and translated in response to the operator manipulating the shift lever. The sensors coact with the shift shaft to sense the position of the shift shaft which corresponds to a particular gear position so this information may be sent to the controller for control of the transmission or other aspects of vehicle operation.

In the past, the shift shaft has included a single annular groove that corresponds to the neutral gear position of the transmission. A pin is biased into the groove by a sensor that has an integral spring. The sensor detects the location of the pin along the shift shaft. When the pin is seated in the annular groove, the sensor detects that the transmission is in a particular position or state, such as the neutral gear position. Undesirably, the vehicle operator must overcome the force of the spring as the pin travels up the annular groove when shifting out of the neutral position and into engagement with a gear. This may increase the shift effort or reduce the shift feel. Therefore, what is needed is an improved switch assembly and shift shaft arrangement that does not adversely affect shift effort or shift feel.

SUMMARY OF THE INVENTION AND ADVANTAGES

The present invention provides a transmission gear position sensing assembly. The assembly includes a transmission housing with a bore having a shift shaft, such as a shift shaft disposed therein. The shift shaft has an axis about which the shaft translates as the transmission is shifted between gear or synchronizer positions. The housing includes a hole with a switch assembly received in the hole transverse to the shift shaft axis. The shift shaft includes a profile aligned with the switch assembly. The profile has first, second, and third surfaces respectively spaced radially from the axis a first, second and third distance. The third surface is arranged between the first and second surfaces. The third distance is larger than the first and the second distances, and the third surface corresponds to a neutral gear position. The switch assembly includes a member biased into engagement with the profile by a spring. The switch assembly senses the gear position by the corresponding location along the profile. Since the third surface, which corresponds to the neutral position, is raised from the other surfaces, the shift effort is reduced as the vehicle operator shifts from the neutral position to one of the other gear positions. In this manner, the switch assembly and switch shaft configuration does not adversely effect the shift effort or shift feel.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
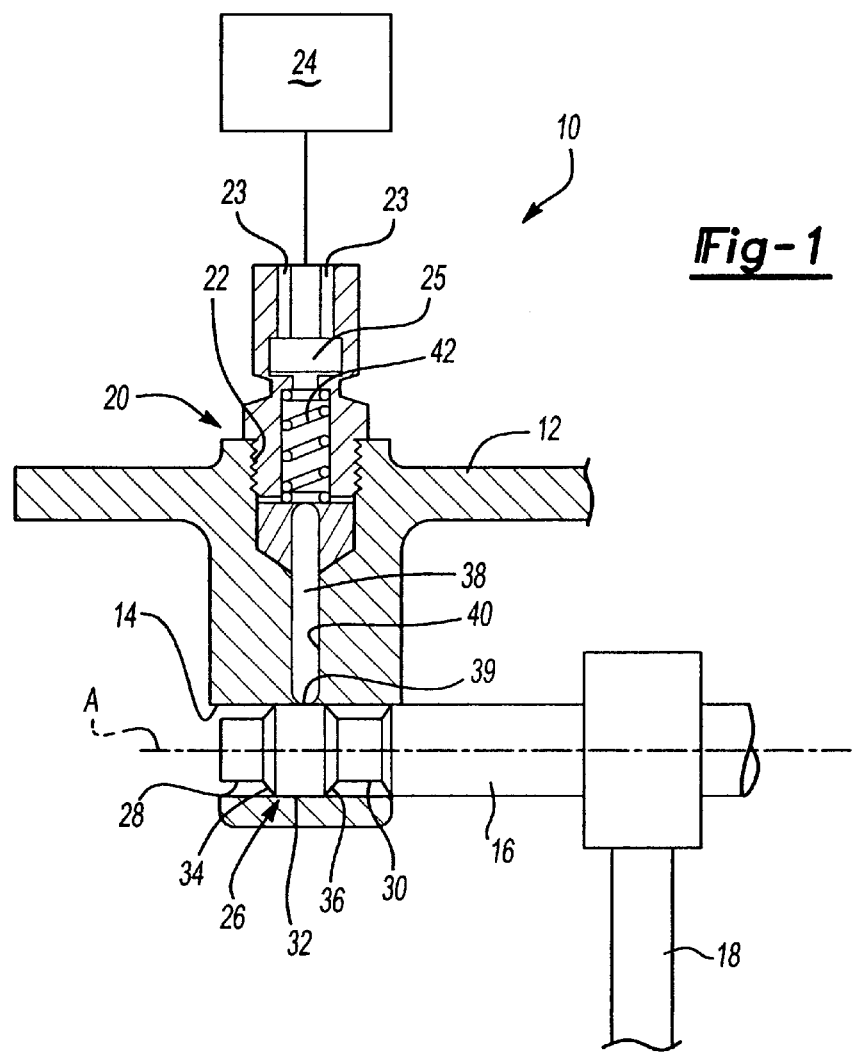
FIG. 1 is a cross-sectional view of the present invention transmission switch shaft and switch assembly.
Figure 2:
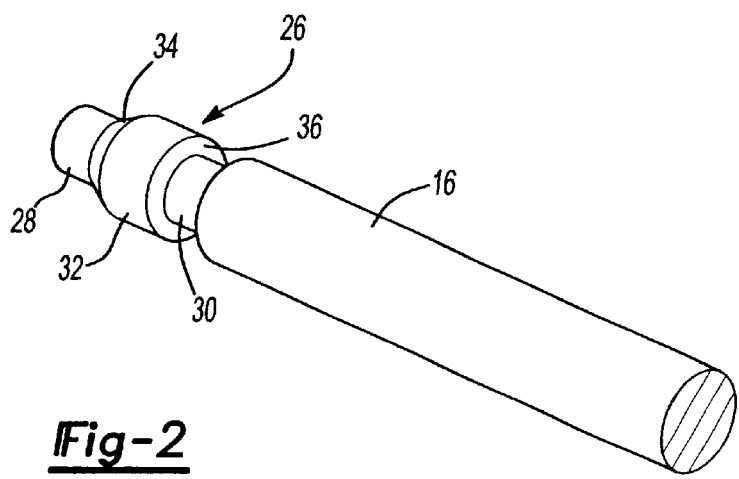
FIG. 2 is a perspective view of the present invention shift shaft profile.

A torsion of a transmission 10 is shown somewhat schematically in cross-section in FIG. 1. The transmission includes a housing 12 that may include a top cover and any number of other housing components that may be secured together in any suitable manner. The housing 12 includes a bore 14 with a portion of a shift shaft 16 disposed therein. The shaft 16 includes an axis A that translates along the axis as the vehicle operator manipulates the transmission with the shift lever (not shown). A shift fork 18 is typically supported by the shift shaft 16 to the transmission clutch collars between gears during shifting. Of course it is to be understood that the present invention may be used with any transmission shaft arrangement, as will be appreciated below.

A switch assembly 20 is received in a threaded hole 22 in the housing 12. The switch assembly 20 is preferably transverse to the shaft 16. The switch assembly 20 is of a type known in the prior art and is connected to a controller 24 via electrical contacts 23. The switch assembly 20 includes a sensing device 25 such as a momentary switch, a proximity switch, or any other suitable sensing or switching device. The switch assembly 20 senses the position of the shift shaft 16 corresponding to the operator selected transmission gear position and sends a signal describing the gear position to the controller 24. Although the switch assembly 20 is described as coacting with the shift shaft 16, it is to be understood that the switch assembly 20 may coact with any suitable component within the transmission by which the transmission gear position may be determined.

The shaft 16 includes a profile 26 aligned with the switch assembly 20. As the shaft 16 is translated when shifting between gear positions, the switch assembly 20 senses or coacts with the profile to determine the gear position. More specifically, the switch assembly 20 includes a pin 38 having a rounded end 39 received within a hole 40 in engagement with the profile 26. A biasing member or spring 42 urges the pin 38 into engagement with the profile 26 as the shift shaft 16 is moved along axis A. The biasing member 42 introduces a force that may be felt by the vehicle operator during shifting. The biasing number 42 may be a spring integral with the switch assembly 20.

The present invention shift shaft profile 26 includes first 28, second 30, and third 32 surfaces proximate to one another. The third surface 32 is arranged between the first 28 and second 30 surfaces. The first 28, second 30, and third 32 surfaces are radially spaced a first, second and third distance respectively from the axis A. For the shift shaft shown, the third surface 32 corresponds to the neutral gear position, and the first 28 and second 30 surfaces correspond to engaged gear positions. The surfaces may be indicative of other transmission positions or states depending upon the application. Although the surfaces 28, 30 and 32 are shown flat they may also be curved. The distances are the apex of the surface. That is, for the first 28 and second 30 surfaces the distance would be the shortest radial distance to the axis A. Conversely, the distance for the third surface 32 would be the greatest radial distance from the axis A. Preferably, a first ramped surface 34 adjoins the first 28 and third 32 surfaces, and a second ramped surface 36 adjoins the second 30 and third 32 surfaces. The ramped surfaces 34 and 36 reduce the force needed to slide the pin 38 from the first 28 and second 30 surfaces to the third surface 32.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the dependent claims, the inventive may be practiced otherwise than as specifically described.

What is claimed is:

1. A vehicle transmission comprising:

a housing having a bore;

a shaft disposed within said bore movable along an axis;

a profile on said shaft including first, second, and third surfaces with said third surface arranged between said first and second surfaces, said first, second, and third surfaces being respectively spaced a first, second, and third radial distance from said axis, said third distance being greater than said first and second distance with said third surface corresponding to a neutral position; and a switch assembly supported by said housing and aligned with said profile with said switch assembly coacting with said profile to determine a transmission gear position.

2. The transmission according to claim 1, wherein said switch assembly includes a member in engagement with said profile and a spring biasing said member into engagement with said profile and producing a force on said shaft.

3. The transmission according to claim 1, wherein said first and second surfaces correspond to first and second engaged gear positions.

4. The transmission according to claim 3, wherein a controller is electrically connected to said switch assembly with said switch assembly sending signals corresponding to said first and second engaged gear positions to said controller when said member is respectively, engaged with said first and second surfaces, and said switch assembly sending a neutral gear position signal to said controller when said member is in engagement with said third surface.

5. The transmission according to claim 1, wherein a ramped surface adjoins said first and third surfaces and said second and third surfaces.

6. The transmission according to claim 1, wherein said shaft supports a shift fork.

7. The transmission according to claim 1, wherein the first and second surfaces are annular grooves in said shaft.

8. A method of sensing a transmission gear position comprising the steps of:

a) moving a switch assembly member along a first surface corresponding to a first engaged position;

b) moving; the member upward from the first surface to an adjacent third surface corresponding to a neutral gear position; and c) moving the member down the third surface to an adjacent second surface corresponding to a second engaged gear position.

* * * * *